(12) United States Patent
Li et al.

(10) Patent No.: US 11,156,770 B2
(45) Date of Patent: Oct. 26, 2021

(54) COUPLED MULTICORE OPTICAL FIBER

(71) Applicant: CORNING INCORPORATED, Corning, NY (US)

(72) Inventors: Ming-Jun Li, Horseheads, NY (US); Jeffery Scott Stone, Addison, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/829,460

(22) Filed: Mar. 25, 2020

(65) Prior Publication Data
US 2020/0326472 A1    Oct. 15, 2020

Related U.S. Application Data

(60) Provisional application No. 62/833,194, filed on Apr. 12, 2019.

(51) Int. Cl.
| | |
|---|---|
| *G02B 6/02* | (2006.01) |
| *G02B 6/028* | (2006.01) |
| *H04B 10/50* | (2013.01) |
| *C03C 13/04* | (2006.01) |

(52) U.S. Cl.
CPC .......... *G02B 6/0288* (2013.01); *C03C 13/046* (2013.01); *G02B 6/02042* (2013.01); *G02B 6/0281* (2013.01); *H04B 10/503* (2013.01)

(58) Field of Classification Search
CPC ................ G02B 6/0288; G02B 6/0281; G02B 6/02042; G02B 6/0365; H04B 10/503; H04B 10/2581; C03C 13/046; C03C 2201/31; C03C 13/045
See application file for complete search history.

(56) References Cited

U.S. PATENT DOCUMENTS

| | | |
|---|---|---|
| 8,666,213 B2 | 3/2014 | Li |
| 10,094,974 B2 | 10/2018 | Chen et al. |

(Continued)

OTHER PUBLICATIONS

Jeunhomme; "Single Mode Fiber Optics" ; Marcel Dekker, New York, (1990) pp. 39-44.

(Continued)

*Primary Examiner* — Ellen E Kim
(74) *Attorney, Agent, or Firm* — Smit Kapadia

(57) ABSTRACT

Multimode optical fibers are disclosed herein. In some embodiment disclosed herein, a multimode optical fiber having a bandwidth of greater than 2 GHz·km includes: a glass matrix having a front endface, a back endface, a length (L), a refractive index $n_{20}$ and a central axis (AC); and a plurality of cores arranged within the glass matrix, wherein the plurality of cores run generally parallel to the central axis between the front and back endfaces and having respective refractive indices $n_{50}$, wherein $n_{50}>n_{20}$, wherein the glass matrix serves as a common cladding for the plurality of cores so that each core and the common cladding define a waveguide, wherein each core is a single mode at an operating wavelength; and wherein any two cores have an center-to-center spacing s of 3 μm to 20 μm and a coupling coefficient of greater than 10 $m^{-1}$ but less than 200 $m^{-1}$.

23 Claims, 12 Drawing Sheets

(56) References Cited

U.S. PATENT DOCUMENTS

| | | | |
|---|---|---|---|
| 2012/0114292 A1* | 5/2012 | Hoover | C03B 37/01493 385/124 |
| 2013/0039627 A1* | 2/2013 | Li | G02B 6/02042 385/126 |
| 2017/0123146 A1* | 5/2017 | Chen | G02B 6/032 |
| 2017/0199325 A1 | 7/2017 | Saito et al. | |
| 2018/0038769 A1* | 2/2018 | Hayashi | G01M 11/3109 |
| 2019/0113682 A1* | 4/2019 | Sakuma | G02B 6/02 |

OTHER PUBLICATIONS

Sakamoto et al; "Coupled Multicore Fiber Design With Low Intercore Differential Mode Delay for High-Density Space Division Multiplexing"; Journal of Lightwave Technology, vol. 33, No. 6, Mar. 15, 2015, pp. 1175-1181.

\* cited by examiner

COUPLED MULTICORE OPTICAL FIBER

This application claims priority under 35 USC § 119(e) from U.S. Provisional Patent Application Ser. No. 62/833,194, filed on Apr. 12, 2019, and which is incorporated by reference herein in its entirety.

FIELD

The present disclosure relates to multicore optical fibers, and in particular to coupled multicore optical fibers.

BACKGROUND

Multicore optical fibers are optical fibers that include a plurality of cores embedded in a cladding matrix. The cores are typically identical or have two different types of cores placed next to each other to reduce the cross-talk between adjacent cores.

Data center applications have seen an increase in data traffic driven by the demand for high content data storage, server virtualization, cloud computing, and higher speed ports. Most links in data centers have short lengths from a few meters to a couple of hundred meters, where multimode fiber (MMF) is the primary fiber with 850 nm VCSEL based transceivers for low cost system solutions. The bandwidth of multimode (MM) fiber is limited mostly by inter-modal chromatic dispersion. To minimize the inter-modal chromatic dispersion, MMF are designed with graded index α-profiles. To achieve high bandwidth in MMF, the refractive index profile needs to be controlled very accurately which is difficult to achieve.

Accordingly, the inventors have developed improved high bandwidth fibers with high yields.

SUMMARY

One embodiment disclosed herein is a multimode optical fiber having a bandwidth of greater than 2 GHz·km that includes: a glass matrix (20) having a front endface (12), a back endface (14), a length (L), a refractive index neo and a central axis (AC); and a plurality of cores (50) arranged within the glass matrix, wherein the plurality of cores run generally parallel to the central axis between the front and back endfaces and having respective refractive indices $n_{50}$, wherein $n_{50} > n_{20}$, wherein the glass matrix serves as a common cladding for the plurality of cores so that each core and the common cladding define a waveguide, wherein each core is a single mode at an operating wavelength; and wherein any two cores have an center-to-center spacing s of 3 μm to 20 μm and a coupling coefficient of greater than 10 $m^{-1}$ but less than 200 $m^{-1}$.

Another embodiment herein is a fiber that includes: two or more of the multicore optical fibers according to claim 1, arranged with the front end faces in a first common endface plane and the back end faces in a second common endface plane.

Another embodiment herein is an optical fiber communication system that includes: at least one multicore optical fiber according to claim 1; an optical transmitter optically coupled to the front endface and that generates light at an operating wavelength of the at least one multicore optical fiber, wherein the light travels within the cores of the at least one multicore fiber as guided light; and a detector optically coupled to the back endface and that detects the guided light that exits the cores of the multicore fiber at the back endface.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
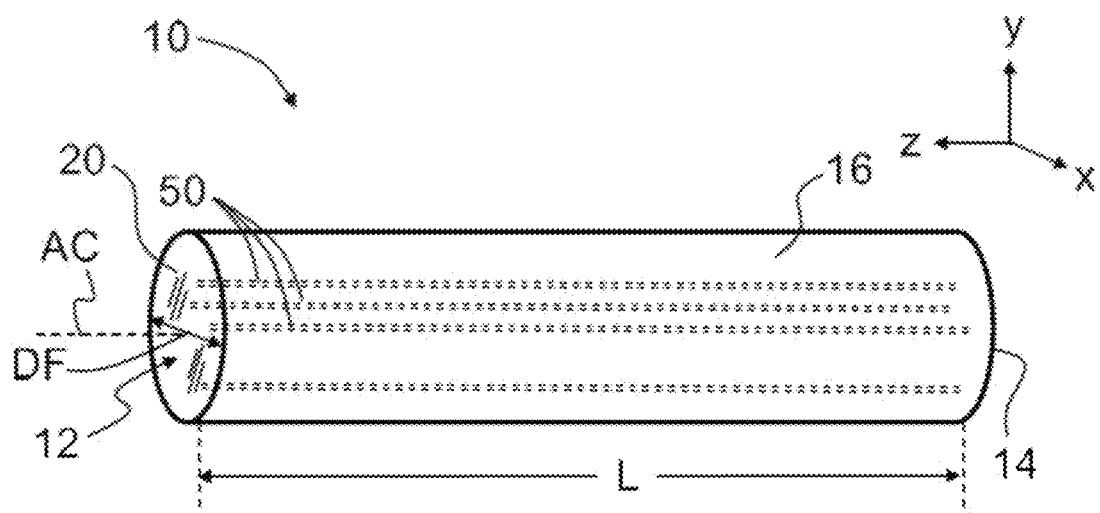
FIG. 1 is a front isometric view of an example multicore optical fiber ("multicore fiber") according to the disclosure, showing a few example cores within a glass matrix.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

In the discussion below, "cross-talk" is referred to as light coupling between cores, though those in the art will understand that it is actually the light coupling that occurs between waveguides. For first and second cores, if light with power P1 is launched into the first core only, and the power of the light coupled from the first core to the second core is $\Delta P1$, then the power of the light in the second core is measured as $P2=\Delta P1$, and the amount of cross-talk from the first to the second core as measured in % is defined as $CT_1=\Delta P_1/P_1$. The cross-talk as measured in decibels (dB) is given by $CT_1=10 \log[\Delta P_1/P_1]$.

For more than two cores, only the neighboring cores (e.g., only those that immediately surround a given core) have significant contributions to the cross-talk, so that the cross-talk from all the neighboring cores is added together, i.e., $CT=\Sigma \Delta P_i/P_i$ measured as a percentage or $CT=\Sigma CT_i=\Sigma 10 \log[\Delta P_i/P_i]$ measured in dB, where stands for "summation over neighboring cores."

As used herein, the term "super-mode" refers to a mode that is a combination of the modes of the individual waveguides which are spatially added. The individual waveguides can be spatially added either in-phase ("even super-mode") or out-of-phase ("odd super-mode").

As used herein, the "refractive index profile" is the relationship between refractive index or relative refractive index and optical fiber radius, given by the abbreviations $r_1$, $r_2$, $r_3$, $r_4$, etc. and lower an upper case are used interchangeability herein.

The "relative refractive index percent" is defined as $4\%=100\times(n_i^2-n_c^2)/2n_i^2$, and as used herein $n_c$ is the average refractive index of the outer cladding region and unless otherwise specified is the refractive index of pure silica. As used herein, the relative refractive index is represented by $\Delta$ and its values are given in units of "%", unless otherwise specified. The terms: relative refractive index delta, delta, $\Delta$, $\Delta \%$, % $\Delta$, delta %, % delta and percent delta may be used interchangeability herein. In cases where the refractive index of a region is less than the average refractive index of the outer cladding, the relative index percent is negative and is referred to as having a depressed region or depressed index. In cases where the refractive index of a region is greater than the average refractive index of the outer cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron. For a person skilled in the art, it will be obvious that the relative index profiles disclosed herein can be modified such that entire index profile is shifted linearly up or down relative to the index of pure silica and result in similar optical properties of the resulting optical fibers.

The term "α-profile" refers to a relative refractive index profile of the region (e.g., core region), expressed in terms of $\Delta(r)$ which is in units of "%", where r is radius. The α-profile of the core (which is defined by the core alpha, or $alpha_{core}$ herein) follows the equation, $$\Delta(r)=\Delta(r_o)(1-[|r-r_o|/(r_1-r_o)]^\alpha),$$

where $r_o$ is the point at which $\Delta(r)$ is maximum, the radius r is moving radially outward from the centerline, $r_1$ is the radial location at which $\Delta(r)$ % first reaches the value 0.03%, and r is in the range $r_i<r<r_f$, where $\Delta$ is defined above, $r_i$ is the initial point of the α-profile, $r_f$ is the final point of the α-profile, and α is an exponent which is a real number.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

FIG. 1 is a schematic view of an exemplary multimode optical fiber ("multicore fiber") according to the disclosure. The multicore fiber 10 has a central axis AC (shown running in the z-direction), a front endface 12, a back endface 14 and an outer surface 16. The multicore fiber 10 has a diameter DF and an axial length L, which measured between the front and back endfaces 12 and 14. In some embodiments, the diameter DF is 80 to 200 µm. In some embodiments, the diameter DF is 100 to 200 µm. In some embodiments, the diameter DF is 150 to 200 µm. In some embodiments, the diameter DF is 80 to 150 µm. In some embodiments, the diameter DF is 80 to 100 µm. The multicore fiber 10 includes a transparent dielectric matrix 20 in which is formed or embedded a plurality of cores 50 that run longitudinally, i.e., generally parallel to central axis AC, and that run between front and back endfaces 12 and 14. In an example, the central axis AC of multicore fiber 10 is also the central axis of glass matrix 20.

In an example, the transparent dielectric matrix 20 is made of glass and so is referred to hereinafter as "glass matrix" 20. Thus, in an example, cores 50 all reside in glass matrix 20. Three cores 50 are shown in FIG. 1 for ease of illustration. In a first type of multicore fiber 10, cores 50 are made of solid material embedded in glass matrix 20, which serves as a common cladding to the cores, in which case the glass matrix is also referred to as "cladding" 20.

Cladding 20 has a refractive index $n_{20}$ while the cores 50 have a refractive index $n_{50}$, wherein $n_{50}>n_{20}$, so that the multiple cores and surrounding common cladding together define multiple waveguides WG (see FIG. 2), wherein the number of waveguides is the same as the number of cores.

Figure 2:
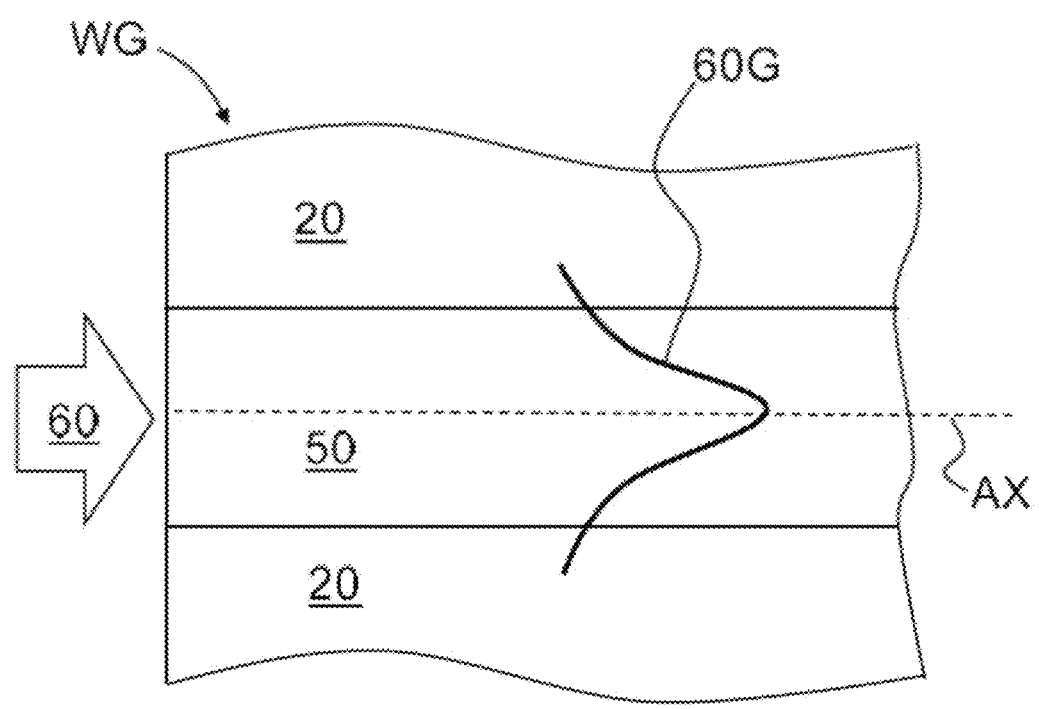
FIG. 2 is a close-up cross-sectional view of a portion of the multicore fiber of FIG. 1 at the front endface and showing one of the cores and the surrounding cladding that together define a waveguide, and also showing a guide mode traveling mainly within the core.

FIG. 2 is a close-up cross-sectional view of a portion of multicore fiber 10 at front endface 12 showing one core 50 and the surrounding cladding 20, the combination of which defines waveguide WG. Light 60 is shown as being incident upon front endface 12 at core 50 and then traveling in waveguide WG as a guided wave (or "guided light" or "guided mode") 60G. The guided wave 60G travels mainly in core 50, with a small portion of the guided light traveling in cladding 20 just outside of the core as evanescent light. The representation of guided wave 60G can be thought of as an intensity profile of a single mode centered on a core axis AX.

In an example, cladding 20 and cores 50 are configured so that the guided light 60G is single mode at an operating wavelength (i.e. the cutoff wavelength of each core is lower than the operating wavelength). In another example, cladding 20 and at least some of cores 50 are configured to support multiple guided modes 60G at an operating wavelength. For ease of discussion, the cores 50 are referred to being either a "single mode" or "multimode" even though it is the combination of cladding 20 and core 50 that defines the light-guiding properties of a given core of multicore fiber 10. In an example, the operating wavelength is a visible wavelength while in another example the operating wavelength is one of the known telecommunication wavelengths (e.g., nominally about 850 nm, or about 1300 nm or about 1550 nm).

In an example, cladding 20 can be made of pure silica, while in another example includes an index-decreasing dopant such as F or B. Also in an example, cores 50 can include an index-increasing dopant such as Ge, Ti, Al, P or Ta.

Figure 5:
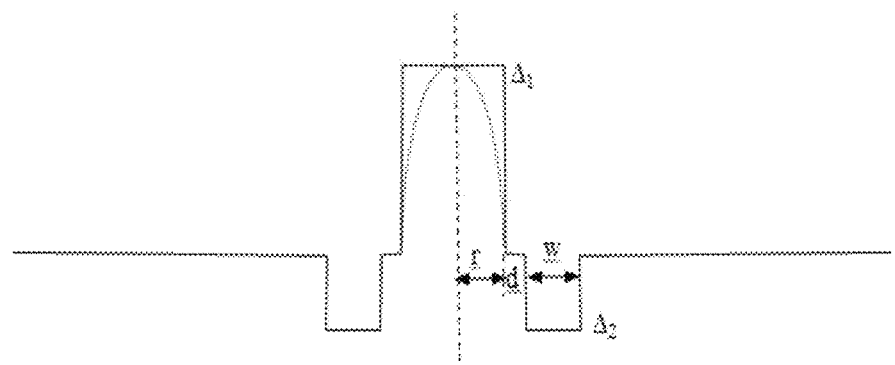
FIG. 5 is refractive index profile of the exemplary multimode optical fiber depicted in FIG. 1, in accordance with some embodiments of the current disclosure.

In an example, the cores 50 need not all be the same, i.e., need not have all of the same properties. For example, cores 50 need not have the same refractive index $n_{50}$. Also in an example, cores 50 need not have the same refractive index profile, which in an example can be defined by an alpha parameter and one or more relative refractive index values (i.e., "deltas") as is known in the art. Cores 50 need not all have the same shape, same size, etc. Cores 50 can also have shapes other than circular, e.g., oval, polygonal, irregular, etc. An exemplary refractive index profile of the cores 50 is shown in FIG. 5. In some embodiments, the cores 50 are characterized by a core delta $\Delta_1$, a core radius r, and a core shape parameter α. An exemplary range for the core delta $\Delta_1$ is 0.2% to 2%. In some embodiments, the core delta $\Delta_1$ is 0.3% to 1.0%. An exemplary range for the core radius is 1 µm to 5 µm. In some embodiments, the core radius is 1.5 µm to 4.5 µm. In some embodiments, the core is a graded index core having a core shape parameter α of 1 to 10. In some embodiments, the core is a step index core having a core shape parameter a of greater than 10, for example from 10-1000, or for example α of 20, 50, 100, 150, 200, 300, 400, 500, 600, 700, 800, 900, 1000. In some embodiments, the cores 50 comprise a low index trench having a trench delta $\Delta_2$ of −0.1% to −0.7% and a trench width w of 0.5 to 5 µm. A low index trench can be used to control the crosstalk between two neighboring cores. In some embodiments, the low index trench is offset from the core by 0 to 5 µm. In some embodiments, the low index trench is directly adjacent to the core.

The multicore fiber 10 has a cross-sectional area $A_{10}$ and is shown in the examples herein has having a circular cross-sectional shape. Other cross-sectional shapes besides circular (e.g., oval, rectangular, square, D-shape, etc.) can also be used. Each core 50 has a cross-sectional area $A_{50i}$, and the total area $A_T$ of the cores is the sum of the individual core areas, i.e., $A_T = \Sigma A_{50i}$. The total cross-sectional area of the cladding is $A_{20}$, while the effective area $A'_{20}$ is given by the cross-sectional area $A_{20}$ minus the total core area $A_{10}$, i.e., $A'_{20} = A_{20} - A_T$.

The total number of cores 50 in multicore fiber 10 is denoted by N. In various examples, N≥10 or N≥50 or N≥100 or N≥250. In an example, a core density ρ is given by the number N of cores per fiber area $A_F$ or the cladding area $A_{20}$. In various examples of multicore fiber 10, the core density $\rho > 800/mm^2$ or $\rho > 4000/mm^2$ or $\rho > 8000/mm^2$ or $\rho > 20000/mm^2$. It is noted that in some examples, the cladding area $A_{20}$ is the same as the fiber area $A_{10}$, and the cladding diameter Dc is the same as the fiber diameter $D_F$. In other examples, the fiber and cladding areas $A_F$ and $A_{20}$ are different, such as in the example now discussed immediately below.

Figure 3:
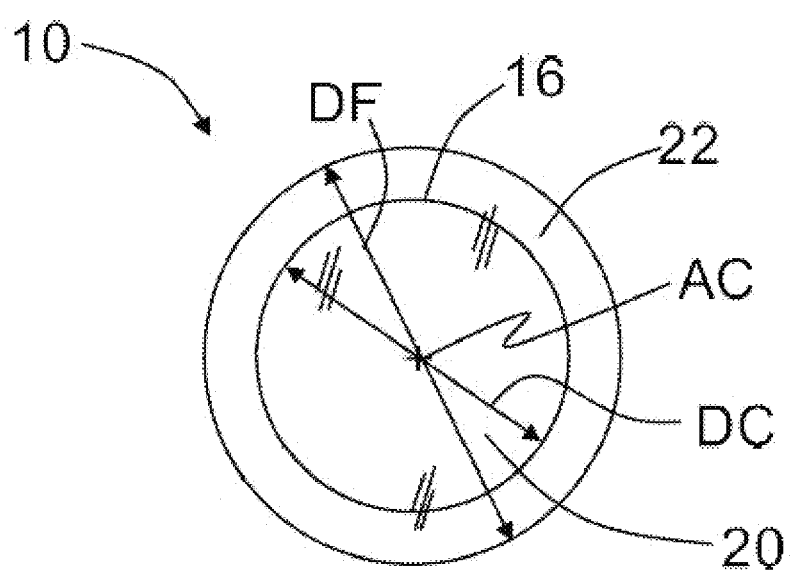
FIG. 3 is a front-on view of an example multicore fiber that includes an outer cladding that surrounds the main cladding that encompasses the multiple cores.
Figure 4:
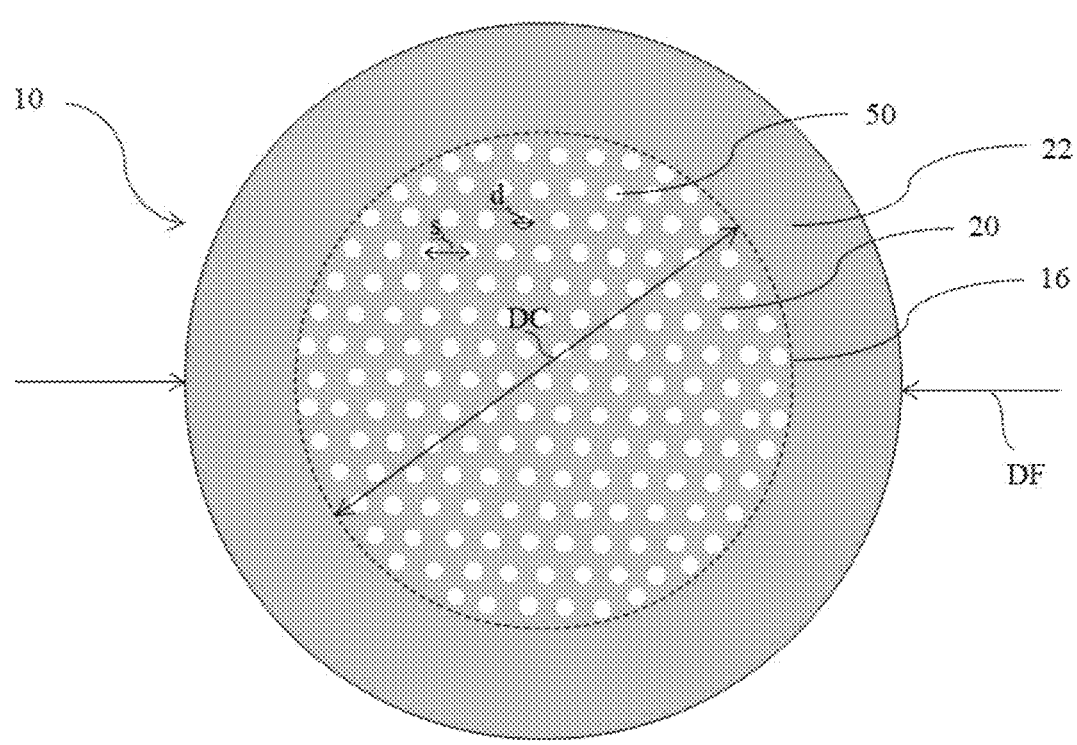
FIG. 4 is a schematic cross-sectional view of a an exemplary multimode optical fiber in accordance with some embodiments of the current disclosure.

FIG. 3 and FIG. 4 is a front-on view of multicore fiber 10 illustrating an embodiment wherein the multicore fiber includes an outer cladding layer ("outer cladding") 22 that surrounds the outer surface 16 of cladding 20. The outer cladding 22 can be employed to control the size of the cladding 20 and the multicore region defined thereby. The outer cladding 22 can be made of pure silica or doped silica. Note that in the embodiment of FIG. 3, the cladding area $A_{20}$ is not the same as the fiber area $A_{10}$ because the fiber area includes the annular area of the outer cladding 22. Likewise, the cladding diameter Dc is not the same as the fiber diameter DE.

In examples, multicore fiber 10 can be configured to operate in either of two main regimes: a weak-coupling regime or a strong-coupling regime, depending on the application. In the weak-coupling regime, the cross-talk between cores 50 is negligible, and each core behaves like a separate waveguide. In the strong-coupling regime, the cores 50 can exchange substantial amounts of optical power during propagation of the guided waves 60G therein, or the modes from different cores can mix with each other, resulting in low time delays or high bandwidth. This regime is attractive for high speed data transmissions for short-reach applications because it does not require accurate alignments to each core, which results in low cost coupling components for transceivers.

Multicore Fiber with Same-Size Cores

A coupled multicore fiber with high bandwidth (e.g. bandwidth greater than 2 GHz·km, or greater than 4 GHz·km), requires (a) the cutoff wavelength of each core to be lower than the operating wavelength; and (b) the coupling between the cores must be sufficient to mix the modes but not cause large differential group delays among the modes. In some embodiments, an effective index difference of less than $1\times10^{-4}$ minimizes group delay differences among the super-modes, resulting in high bandwidth greater than 2 GHz·km, or even greater than 4 GHz·km.

The coupling coefficient depends on the overlap integral between two adjacent cores, which depends on the core design and core spacing. The coupling coefficient is preferably greater than 10 $m^{-1}$, but less than 200 $m^{-1}$, so that the super-modes have effective index differences less than $1\times10^{-4}$ and can couple to each other to increase the fiber bandwidth. In some embodiments, the coupling between the super-mode can be enhanced by introducing periodic perturbations such as fiber spinning, and refractive index modulation by laser treatment during the draw. The period of perturbations is in the range of a few millimeters to a few centimeters, or a few meters, for example 0.5 mm to 1 meter. Periodic perturbations may be introduced via the methods and apparatus disclosed in U.S. Pat. No. 8,666,213 issued Mar. 4, 2014 to Corning Incorporated.

FIG. 4 is a cross-sectional view of an example multicore fiber 10 taken in the x-y plane and illustrates an example wherein cores 50 all have the same size, e.g., the same diameter d. In some embodiments, the cladding diameter Dc is 30 to 100 µm. In some embodiments, the cladding diameter Dc is 50 to 100 µm. In some embodiments, the cladding diameter Dc is 70 to 100 µm. In some embodiments, the cladding diameter Dc is 30 to 70 µm. In some embodiments, the cladding diameter Dc is 30 to 50 µm. The cores 50 may not have not have the same refractive index $n_{50}$ and may not have the same refractive index profile. In some embodiments, the diameter d of each core 50 is 2 µm to 10 µm. In some embodiments, the diameter d of each core 50 is 2 µm to 8 µm. In some embodiments, the diameter d of each core 50 is 2 µm to 6 µm. In some embodiments, the diameter d of each core 50 is 2 µm to 4 µm. In some embodiments, the diameter d of each core 50 is 4 µm to 10 µm. In some embodiments, the diameter d of each core 50 is 6 µm to 10 µm. In some embodiments, the diameter d of each core 50 is 8 µm to 10 µm.

The center-to-center spacing between any two cores 50 is denoted by distance s. The core spacing affects the mode coupling strength and differential group delays (DGD). For identical cores, a larger spacing between the cores results in a weaker coupling effect and a smaller difference between the effective indices. In some embodiments, the distance s is 3 µm to 20 µm. In some embodiments, the distance s is 5 µm to 20 µm. In some embodiments, the distance s is 10 µm to 20 µm. In some embodiments, the distance s is 15 µm to 20 µm. In some embodiments, the distance s is 3 µm to 15 µm. In some embodiments, the distance s is 3 µm to 10 µm. In some embodiments, the distance s is 3 µm to 5 µm. The spacing s is about the same for all adjacent cores. The center-to-center spacing s can be used to determine an edge-to-edge spacing by knowing the diameter d of the two cores 50 associated with the spacing measurement. The ratio of core spacing over the core diameter s/d is in the range of 1.1 to 10. In some embodiments, s/d is 1.2 to 6.

In an example, the core diameters d can be selected so that all of the cores are single mode. The number N of cores 50 arranged in cladding 20 can vary, with the maximum number $N_{MAX}$ being advantageously employed for applications where multicore fiber 10 is used for datacenter applications. The maximum number $N_{MAX}$ of cores 50 (as well as the maximum core density $\rho_{MAX}$) represents the most cores 50 that can fit within cladding 20 while satisfying the spacing condition for the desired coupling coefficient.

Thus, an example of a first type of multicore fiber 10 has cores 50 subject to the spacing constraint based on a cross-talk limit for operating either in the weak-coupling regime or the strong-coupling regime, wherein the cores can have or can define at least one of: same sizes, different sizes, same refractive index profiles, different refractive index profiles (e.g., core deltas), same shapes, different shapes, different core densities p, and a maximum number $N_{MAX}$ of cores (or a maximum core density $\rho_{MAX}$). Here, the cores 50 having "different properties" means that not all of the cores have the same property, i.e., some of the cores can have the same property.

Multicore Fiber Fabrication

The various embodiments of the multicore fibers 10 disclosed herein can be fabricated by using a stack and draw method as is known in the art. First, a glass core blank is prepared, for example by an OVD method. Then glass cores canes with desired diameters and lengths are redrawn from the glass core blank. The core canes are inserted into a large diameter glass tube to form a preform assembly. The tube wall forms a thin layer of outer cladding. Additional outer cladding layer can be added by depositing glass by OVD process. Finally, the preform assembly is drawn into the multicore fiber using a fiber draw tower.

Another method for making the multicore fibers 10 is to use the cane-in-soot method. First, a glass core blank is prepared, for example by an OVD method. Then glass cores canes with desired diameters and lengths are redrawn from the glass core blank. Next, a silica soot tube blank with a large central hole region is made by an OVD method. The core canes are inserted into the central hole region of soot tube to form a canes-in-soot assembly. Then the cane-in-soot assembly is consolidated using a soot consolidation process. During the consolidation process, the soot tube is densified into a glass tube that is collapsed on the glass core canes to form a glass preform assembly. The tube wall forms a thin layer of outer cladding. Additional outer cladding layer can be added by depositing glass by OVD process. Finally, the preform assembly is drawn into the multicore fiber using a fiber draw tower.

Examples Multicore Fiber

Five example multicore fibers 10, having 14, 125 cores, and 165 cores were fabricated as follows: For the 14 core fiber, a pure silica soot blank with 350 gram soot was deposited onto a ceramic rod of 9 mm in diameter. After soot deposition, the ceramic rod was removed to leave central hole in the soot blank. Then a germanium doped core glass blank was made and redrawn into 2 mm glass canes. The canes have a core of 0.34% delta and core/clad ratio of 0.33. Fourteen core canes were inserted into the central hole of the soot blank. The blank was consolidated to form a solid glass preform. The preform was drawn into fiber of 125 µm diameter.

For the 125 core fiber, a preform was made using the rods in tube method. A core blank was made using the OVD method. The core was doped with Ge and the cladding was pure silica. The core delta was 1%. The core clad ratio was 0.47. The core blank was then redrawn to multiple 3 mm canes. The core canes were inserted into a quartz tube with dimensions of 40 mm inner diameter (ID) and 50 mm outer diameter (OD) and 20 inches in length creating a tight bundle inside the tube. Once the build was complete the tube assembly was chlorine purged in a consolidation furnace to remove any impurities in an effort to enhance draw performance. The preform was drawn into fiber with 125 μm diameter.

For the 165 core fiber, a core blank was made using an OVD method. The core was doped with Ge and the cladding was pure silica. The core delta was 1.2%. The core clad ratio was 0.75. In the next step, the cane was redrawn to small canes with a diameter of 2 mm. 165 canes were inserted into a central hole of a soot blank. The soot blank with the inserted canes was then consolidated into a solid glass preform. The preform was drawn into fibers with diameters of 165 μm, 175 μm. The fiber of 175 μm diameter was drawn with two conditions, with fiber spinning and without fiber spinning, while the fiber of 165 μm was drawn with fiber spinning only. For the fiber draw with fiber spinning, a fiber spin device was used to rotate the fiber sinusoidally with a spin amplitude of about 3 turn/m and a spin period of about 1 m.

Data Transmission System

Figure 8:
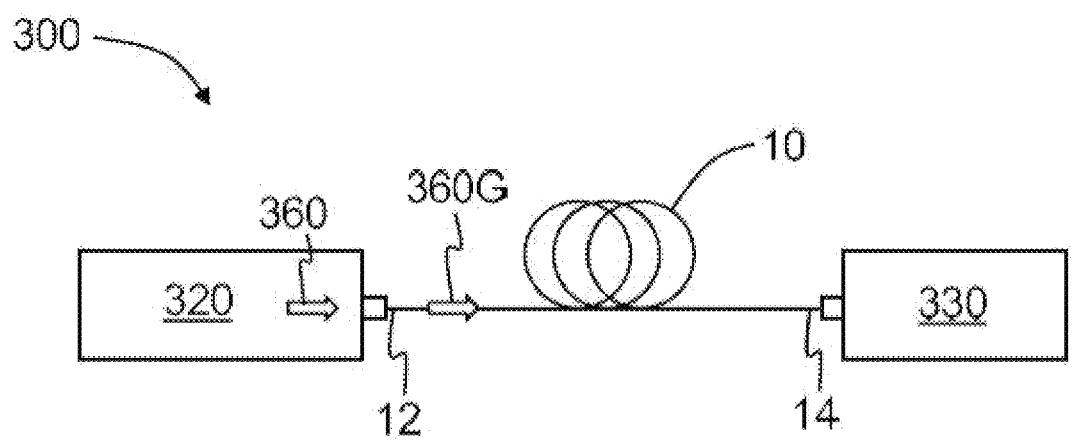
FIG. 8 is a schematic diagram of an optical fiber transmission system that employs an example multicore fiber as disclosed herein.

FIG. 8 is a schematic diagram of an example optical fiber transmission system ("system") 300 that employs a transmitter (light source) 320 that emits modulated light 360, and a receiver 330 optically connected by at least one multicore fiber 10 that carries the modulated light 360 as guided light 360G. The multicore fiber 10 defines an optical link for data transmission. The receiver 330 is configured to receive modulated guided light 360G from output end 14 of the multicore fiber 10. The transmitter 320 can be one that is used with a VCSEL-based or an SiPh-based transmitter.

The transmitter 320 emits modulated light 360 (i.e., modulated optical signals) having a wavelength in the range from 800 nm to 1600 nm and multicore fiber 10 can have operating wavelengths in this range. The transmitter 320 can also consist of or otherwise include a SiP-based light source, which in an example emits modulated light 360 having a wavelength in the range from 1250 nm to 1650 nm. The transmitter 320 can also consist of or otherwise include a VCSEL-based light source, such as used in CWDM applications in a wavelength range of 840 nm to 980 nm or 840 nm to 950 nm. A VCSEL light source can also emit light in the wavelength range from 800 nm to 1350 nm. Thus, in an example, transmitter 320 can emit light 360 of different wavelengths in the given wavelength range, e.g., for WDM-related applications.

Figure 6:
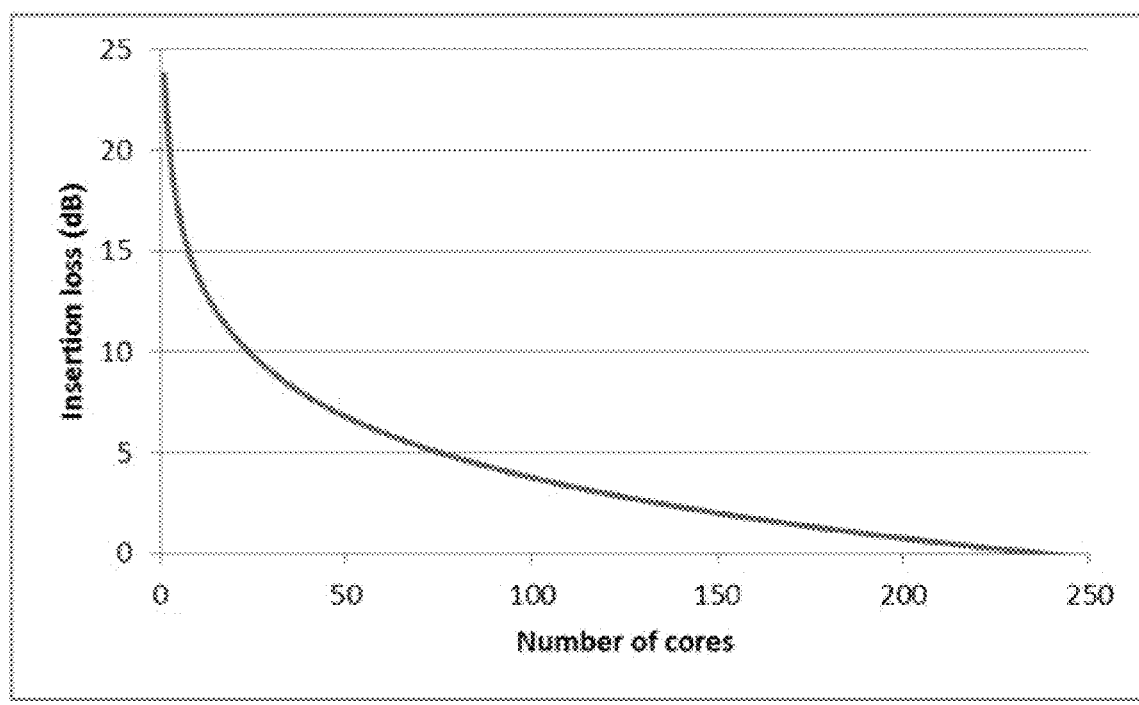
FIG. 6 is a graph depicting insertion loss from a VCSEL to a coupled multicore fiber at 850 nm in accordance with some embodiments of the current disclosure.

For datacenter applications, multimode VCSEL transmitters are used for low cost. The VCSEL transmitters are designed for coupling to multimode fibers with core NA of 0.2 and core diameter about 50 μm. For coupling light from a VCSEL to a coupled multicore fiber with low loss, the fiber needs to have enough cores to capture the light from the laser. The coupling loss to from a laser to a multicore fiber can be estimated using the following equation:

$$IL = 10\log\left(\frac{Nna^2d^2}{NA^2D^2}\right)$$

Where na is the numerical aperture of each core, d is the diameter of each core, N is the number of cores, NA is the numerical aperture of the laser, and D is the diameter of the laser beam. Because current VCSELs are designed for the multimode fiber with NA=0.2, and D=50 μm, these number can be used to estimate the insertion loss to a coupled multicore fiber. For step index profile cores with the core cutoff wavelength less than 850 nm, the product of na and d need is less than 0.648 μm. In one embodiment na=0.12 and d=5.4 μm. In another embodiment, na=0.2 and d=3.24 μm. In another embodiment, na=0.29 and d=2.24 μm. FIG. 6 shows the insertion loss from the VCSEL to a multicore fiber as a function of number of cores. To obtain an insertion loss of 3 dB, the number of cores needed is 120. If the number of cores is increased to 240, the insertion loss is close to zero.

Figure 7:
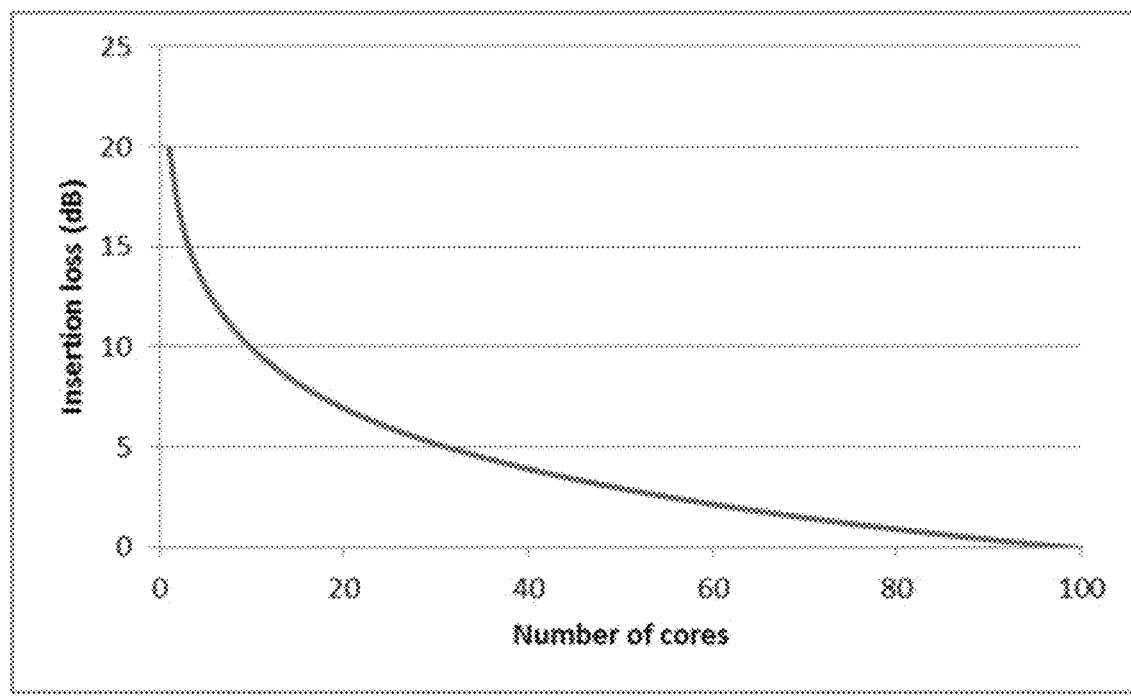
FIG. 7 is a graph depicting insertion loss from a VCSEL to a coupled multicore fiber at 1310 nm in accordance with some embodiments of the current disclosure.

For step index profile cores with the core cutoff wavelength less than 1310 nm, the product of na and d is less than 1.008 μm. In one embodiment na=0.12 and d=8.4 μm. In another embodiment, na=0.2 and d=5.1 μm. In another embodiment, na=0.29 and d=3.5 μm. FIG. 7 shows the insertion loss from the VCSEL to a multicore fiber as a function of number of cores. At this wavelength, the number of cores is lower to achieve the same insertion loss than at the wavelength of 850 nm because the core is larger. To obtain an insertion loss of 3 dB, the number of cores needed is 49. If the number of cores is increased to 98, the insertion loss is close to zero.

Table 1 shows design examples for coupled multicore fibers operating at 850 nm, and Table 2 shows design examples of multicore fibers operating at 1310 nm. Table 3 shows measured results of the actual fibers with 14, 125 and 165 cores. High bandwidths of 1.1 to 12.3 GHz were demonstrated. Also, Ex $A_4$ with fiber spinning on and $A_5$ with fiber spinning off show that fiber spinning can increase the fiber peak bandwidth. These bandwidth results show that the proposed coupled multicore fibers are suitable for data center applications.

TABLE 1

Design examples of coupled multicore fibers for 850 nm

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Core delta (%) | 0.34 | 0.34 | 0.34 | 1 | 1 | 1 | 2 | 2 |
| Core NA | 0.12 | 0.12 | 0.12 | 0.2 | 0.2 | 0.2 | 0.29 | 0.29 |
| Core alpha | 20 | 20 | 20 | 20 | 20 | 2 | 2 | 2 |
| Core diameter d (μm) | 5.4 | 5.4 | 5.4 | 3.2 | 3.2 | 4.6 | 2.2 | 2.2 |
| Trench delta (%) | 0 | 0 | −0.5 | 0 | 0 | 0 | 0 | 0 |
| Trench offset (μm) | 0 | 0 | 0 | 0 | 0 | 0 | 0 | 0 |
| Trench width (μm) | 0 | 0 | 2 | 0 | 0 | 0 | 0 | 0 |
| Core separation s (μm) | 6.8 | 6.8 | 11.9 | 4.4 | 4.4 | 9.2 | 3.4 | 3.4 |
| Ratio of s/d | 1.26 | 1.26 | 2.20 | 1.38 | 1.38 | 2 | 1.54 | 2.54 |
| Number of cores | 240 | 170 | 80 | 240 | 145 | 85 | 240 | 86 |
| Multicore diameter $D_0$ (μm) | 100 | 80 | 100 | 62.5 | 50 | 80 | 50 | 30 |

TABLE 2

Design examples of coupled multicore fibers for 1310 nm

| | Ex. 9 | Ex. 10 | Ex. 11 | Ex. 12 | Ex. 13 | Ex. 14 | Ex. 15 | Ex. 16 |
|---|---|---|---|---|---|---|---|---|
| Core delta (%) | 0.34 | 0.34 | 0.34 | 1 | 1 | 1 | 2 | 2 |
| Core NA | 0.12 | 0.12 | 0.12 | 0.2 | 0.2 | 0.2 | 0.29 | 0.29 |
| Core alpha | 20 | 20 | 20 | 20 | 20 | 2 | 20 | 20 |
| Core diameter d (μm) | 8.4 | 8.4 | 8.4 | 5.1 | 5.1 | 7 | 3.5 | 3.5 |
| Trench delta (%) | 0 | 0 | −0.5 | 0 | 0 | 0 | 0 | 0 |
| Trench offset (μm) | 0 | 0 | 0 | 0 | 0 | 0 | 0 | 0 |
| Trench width (μm) | 0 | 0 | 1 | 0 | 0 | 0 | 0 | 0 |
| Core separation s (μm) | 10.9 | 10.9 | 10.4 | 6.8 | 6.8 | 10.5 | 5.3 | 5.3 |
| Ratio of s/d | 1.30 | 1.30 | 1.24 | 1.33 | 1.33 | 1.50 | 1.51 | 1.51 |
| Number of cores | 94 | 60 | 66 | 94 | 60 | 50 | 94 | 36 |
| Multicore diameter $D_0$ (μm) | 100 | 80 | 80 | 62.5 | 50 | 70 | 50 | 30 |

TABLE 3

Actual fibers examples of coupled multicore fibers

| | Ex. A1 | Ex. A2 | Ex. A3 | Ex. A4 | Ex. A5 |
|---|---|---|---|---|---|
| Core delta (%) | 0.34 | 1 | 1.2 | 1.2 | 1.2 |
| Core NA | 0.12 | 0.2 | 0.22 | 0.22 | 0.22 |
| Core alpha | 20 | 2.1 | 2.1 | 2.1 | 2.1 |
| Core diameter d (μm) | 4.9 | 5.5 | 3.88 | 4.22 | 4.22 |
| Core separation s (μm) | 13.9 | 7.4 | 5.17 | 5.62 | 5.62 |
| Ratio of s/d | 2.84 | 1.35 | 1.33 | 1.33 | 1.33 |
| Number of cores | 14 | 125 | 165 | 175 | 175 |
| Multicore diameter $D_0$ (μm) | 50.9 | 91 | 77.8 | 83.4 | 83.4 |
| Fiber diameter D (μm) | 125 | 125 | 165 | 175 | 175 |
| Fiber spinning | off | off | on | on | Off |
| Bandwidth @810 nm (GHz · km) | 5.1 | 2.2 | 3.8 | 3.5 | 3.7 |
| Bandwidth @850 nm (GHz · km) | 6.6 | 2.8 | 7.5 | 3 | 2.8 |
| Bandwidth @880 nm (GHz · km) | 7.3 | 3.2 | 6.1 | 4.3 | 3.8 |
| Bandwidth @915 nm (GHz · km) | 9.3 | | 2.4 | 7.0 | 5.6 |
| Bandwidth @965 nm (GHz · km) | 12.3 | | 1.3 | 2.4 | 2.5 |
| Bandwidth @1310 nm (GHz · km) | 4.3 | 1.1 | | | |

Figure 9:
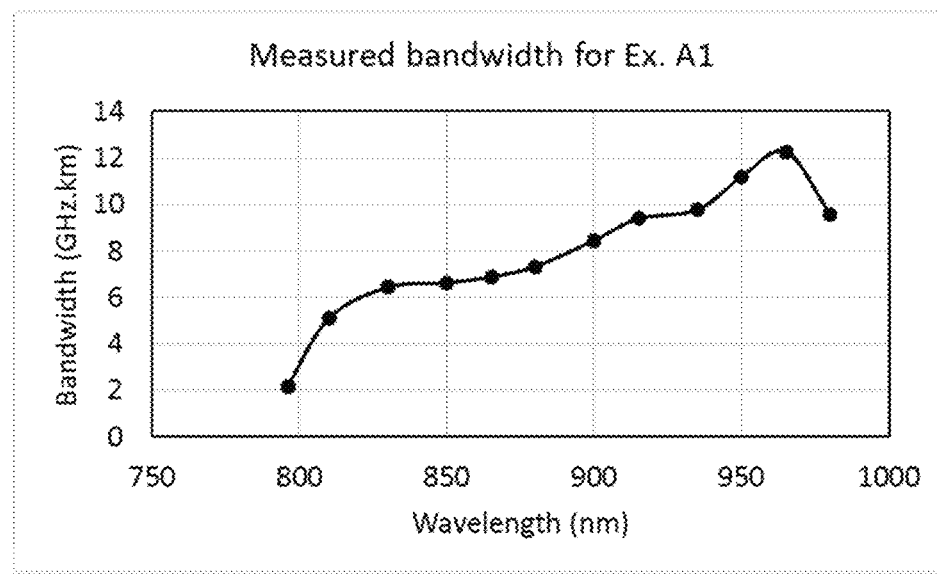
FIG. 9 is a graph plotting wavelength (nm) vs. bandwidth (GHz·km) for exemplary optical fiber A1 described in Table 3 in accordance with some embodiments of the current disclosure.

FIG. 9 is a graph plotting wavelength (nm) vs. bandwidth (GHz·km) for exemplary optical fiber A1 described in Table 3 in accordance with some embodiments of the current disclosure. FIG. 9 depicts an increase in bandwidth at increasing wavelengths, with a peak bandwidth at approximately 956 nm.

Figure 10:
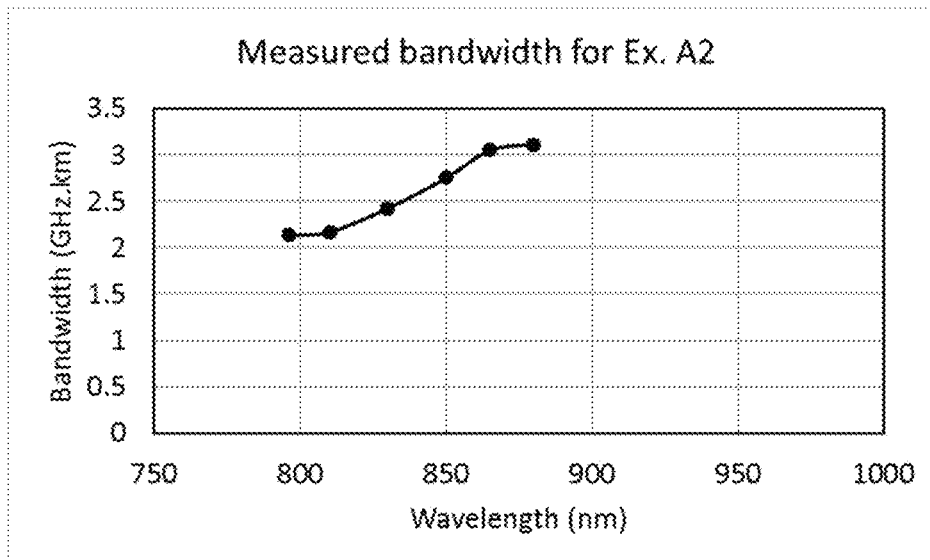
FIG. 10 is a graph plotting wavelength (nm) vs. bandwidth (GHz·km) for exemplary optical fiber A2 described in Table 3 in accordance with some embodiments of the current disclosure.

FIG. 10 is a graph plotting wavelength (nm) vs. bandwidth (GHz·km) for exemplary optical fiber A2 described in Table 3 in accordance with some embodiments of the current disclosure. FIG. 10 depicts an increase in bandwidth at increasing wavelengths, with a peak bandwidth at approximately 880 nm.

Figure 11:
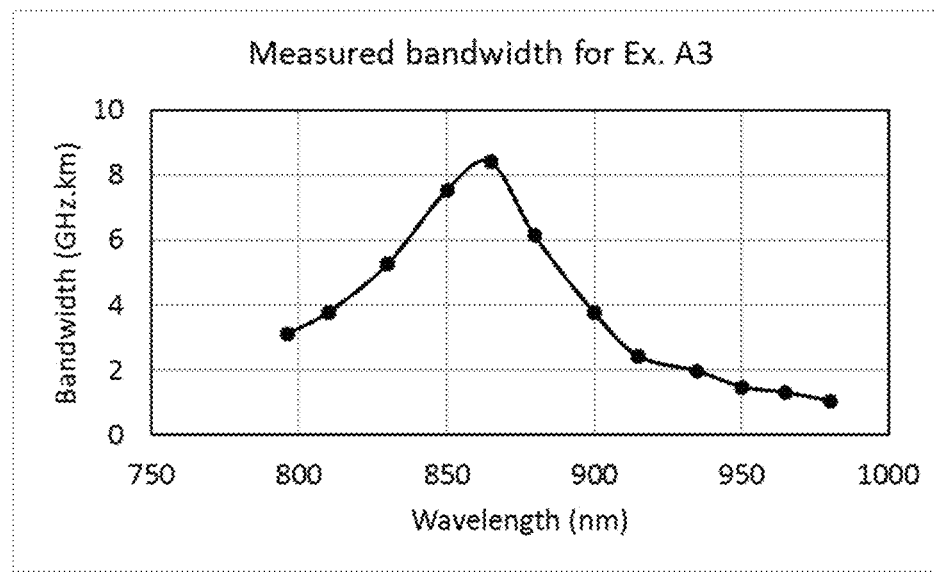
FIG. 11 is a graph plotting wavelength (nm) vs. bandwidth (GHz·km) for exemplary optical fiber A3 described in Table 3 in accordance with some embodiments of the current disclosure.

FIG. 11 is a graph plotting wavelength (nm) vs. bandwidth (GHz·km) for exemplary optical fiber A3 described in Table 3 in accordance with some embodiments of the current disclosure. FIG. 11 depicts an increase in bandwidth from wavelengths of approximately 810 nm to approximately 850 nm, with a peak bandwidth at approximately 850 nm, with a subsequent decrease in bandwidth from approximately 850 nm to approximately 965 nm.

Figure 12:
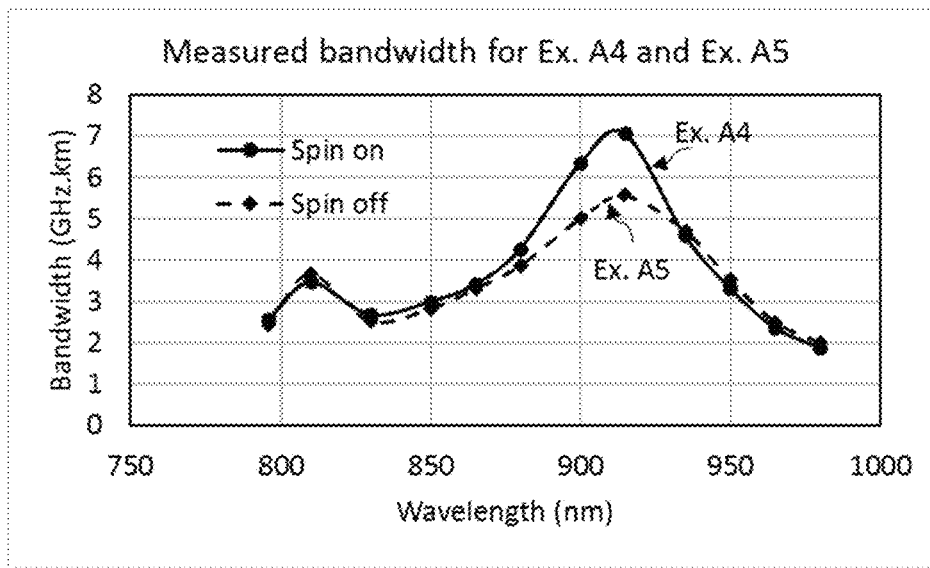
FIG. 12 is a graph plotting wavelength (nm) vs. bandwidth (GHz·km) for exemplary optical fibers A4 and A5 described in Table 3 in accordance with some embodiments of the current disclosure.

FIG. 12 is a graph plotting wavelength (nm) vs. bandwidth (GHz·km) for exemplary optical fibers $A_4$ and $A_5$ described in Table 3 in accordance with some embodiments of the current disclosure. Exemplary fibers $A_4$ and $A_5$ have identical properties (e.g. Core delta, core NA, core alpha, core diameter, core separation, number of cores, multicore diameter, fiber diameter) with fiber $A_4$ produced with fiber spinning on and fiber $A_5$ produced with fiber spinning off. FIG. 12 shows that fiber spinning can increase the fiber peak bandwidth.

Exemplary Fiber Design and Fabrication

To construct an exemplary coupled MCF as a multimode fiber, the inventors considered individual cores with a relative refractive index of the core or core delta of 1.2%. The refractive index profile is a graded index design with an alpha parameter of 2.1. The fiber is designed for 850 nm wavelength transmission using low cost VCSEL transceivers. To achieve high bandwidth, each core is designed to be single mode at the operating wavelength. The core diameter is selected to be 1.95 μm to ensure the LP11 mode cutoff wavelength below 850 nm.

The core spacing affects the mode coupling strength and differential group delays (DGD). To understand the coupling between cores, a simple two-core fiber is considered first. The two-core fiber supports two super-modes, a symmetric mode and an anti-symmetric mode. The two super-modes have different effective indices due to coupling between the two cores. For identical cores, a larger spacing between the cores results in a weaker coupling effect and a smaller difference between the effective indices. The DGD follows the same trend as shown by Curve A in FIG. 13, where the DGD is plotted as a function of D/a, where D is the spacing between the cores and a is the core radius. It is observed that the DGD decreases with D/a and approaches zero when D/a is very large. The bandwidth of such a two-core fiber can be as high as that of a single-mode fiber.

Figure 13:
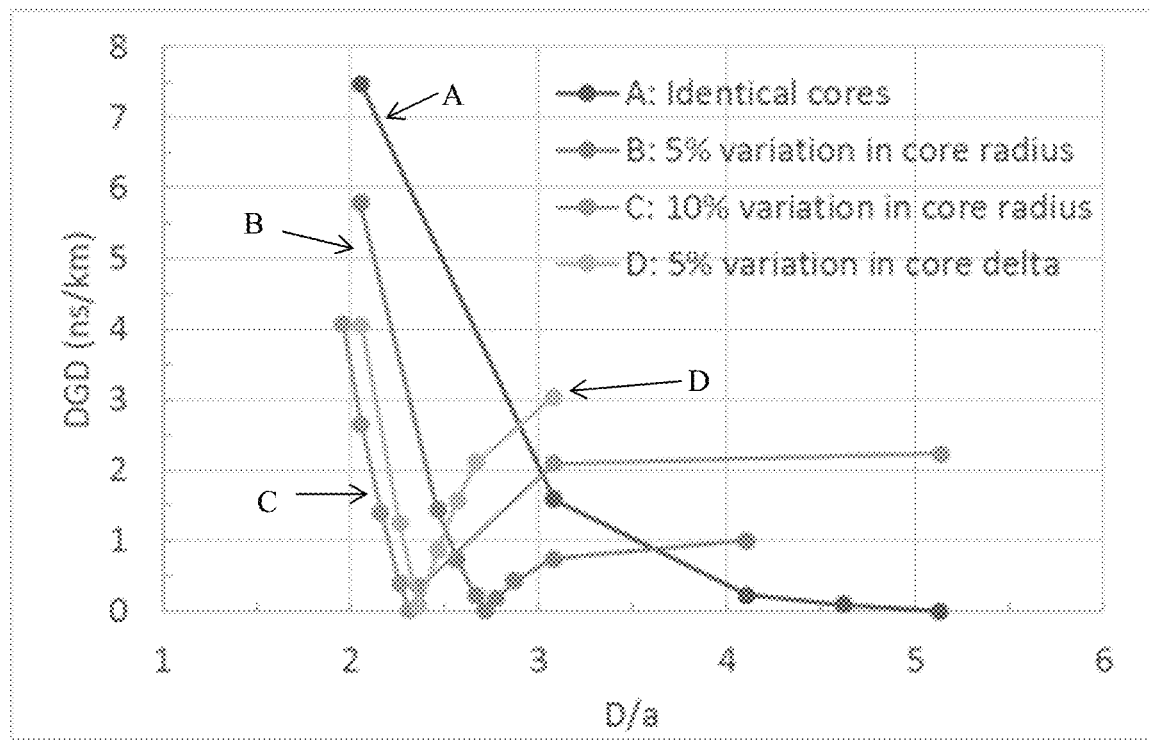
FIG. 13 is graph plotting differential group delays (DGD) as a function of D/a, where D is the spacing between the cores and a is the core radius.

The assumption of identical cores, however, is not realistic. Due to imperfections in the fabrication process, the index contrast and the radius of cores may vary. To take into account these factors, the inventors simulated two-core fibers with different core sizes and index contrast. In FIG. 13, Curve B was obtained by assuming 5% variation of the core radius, (i.e. the radius of the two cores are a1=1.95 μm and a2=1.85 μm respectively). This curve shows that the absolute value of DGD changes with D/a, here a is the average radius of the two cores. The DGD decreases with D/a at first and then increases. When the cores are placed very close, strong coupling between the two cores results in a split of effective indices, as we discussed in the identical core case. When the cores are far apart, there is no coupling at all, and the two cores behave like two isolated single-mode cores. Because the cores have different radii, the group velocities are thus different and there is a finite DGD for the case of isolated cores. This phenomenon can be observed from the saturation of the DGD for a large D/a as shown in Curve B of FIG. 13. The DGD is zero when D/a=2.7. The inventors also studied the two-core fiber with a1=1.95 μm and a2=1.75 μm, corresponding to 10% variation of the core radius and the results are shown in Curve C of FIG. 13. The DGD follows the same trend as the case with 5% radius variation, but the zero DGD point is now at D/a=2.3, smaller than that of the case with 5% variation. Besides the variation in the core radius, the index contrast of cores can also fluctuate. With a 5% fluctuation of the index contrast, i.e. $\Delta 1=1.2\%$ and $\Delta 2=1.14\%$, the DGD becomes zero at D/a=2.35 as shown by Curve D of FIG. 13. The core spacing impacts reduction of DGD, and the optimum spacing depends on the core design and fluctuations of core parameters in practical fibers. The results in FIG. 13 suggest that, for the core design described earlier, a D/a value between about 2 to 3 can be used to minimize the DGD to get optimal bandwidth of multicore fibers with a large core count. To confirm this result, the inventors simulated a multicore fiber containing 109 cores with the same core design arranged in a triangular lattice. The core radius follows a Gaussian distribution with an average core radius μ=1.95 μm and a standard deviation a=0.1 μm. The minimum DGD for this fiber is achieved when D/a=2.9, which is in the range predicted by the two core model.

Based on the design, we fabricated a multicore fiber. A core preform was made first using an outside vapor deposition process. The core delta is 1.2%. The preform was redrawn into core canes of 2 mm in diameter. The core canes were then inserted into a silica soot blank and consolidated into a glass multicore preform. The multicore preform was subsequently drawn into optical fiber using a fiber draw tower.

Fiber Characterization and System Testing

Figure 14:
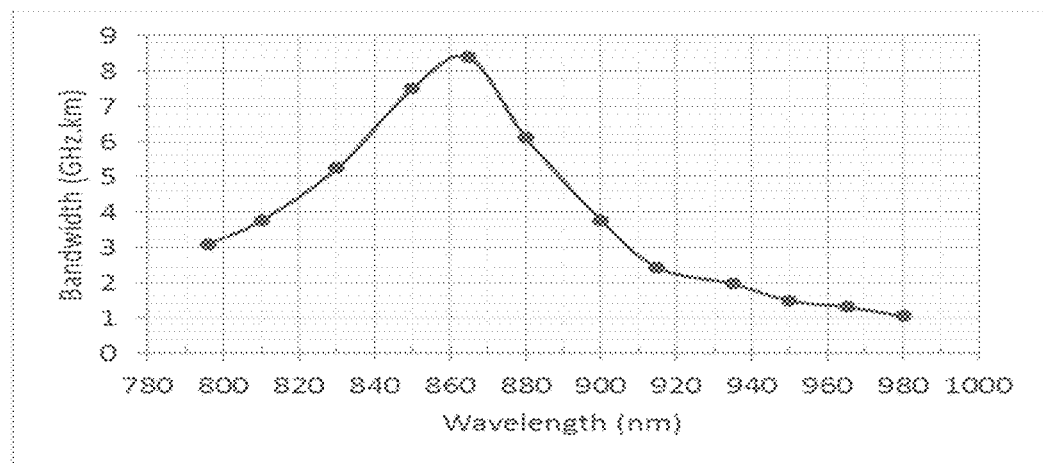
FIG. 14 is a graph plotting measured bandwidth as a function of wavelength for an exemplary multimode optical fiber in accordance with some embodiments of the current disclosure.

The modal bandwidth of the multicore fiber was measured over a wavelength range from 796 nm to 980 nm. FIG. 14 shows the measured bandwidth as a function of wavelength. The fiber has a peak bandwidth of 8.4 GHz·km at 865 nm, close to the target wavelength of 850 nm. The bandwidth at 850 nm is about 7.5 GHz·km, well above the 4.7 GHz·km for OM4 MMF. The fiber was also measured for deferential mode delay (DMD) at 953 nm at different locations across the fiber core area, which showed that the pulse temporal centroid was constant across the fiber, and the output pulse had near-Gaussian pulse dispersion relative the input pulse shape. This result indicates that the measured bandwidth of the exemplary fiber described herein does not depend on the launch condition, which is different from conventional multimode fibers. This can be explained by mode coupling effects in the fiber. Because of mode coupling, the power distribution reaches equilibrium after a short distance. Therefore the bandwidth is independent of the launch condition. The bandwidth results indicate that the multicore fiber design is highly attractive for making high bandwidth fibers for short reach applications.

With the coupled MCF characterized, the transmission experiment proceeded using a 25 Gb/s SR transceiver (e.g. Hisense LTF8505-BC+), which is based on a multimode VCSEL. The transmitter's output optical power is −0.42 dBm. The transmission distances of this transceiver in 50 μm core MMFs are 70 m for OM3 and 100 m for OM4.

Since the MCF has a core diameter around 70 μm, larger than conventional MMF with 50 μm core diameter, an optical coupling setup was built to ensure low loss coupling of light from the coupled MCF into a 50 μm core MMF, which is connected to the receiver. The coupling setup consists of two sequential lenses mounted on a cage system. Focal lengths of 15.3 mm and 11.0 mm and NA for 0.16 and 0.26 were chosen for lens 1 and lens 2, respectively to optimize the coupling of the light from the launch fiber (the coupled MCF) into receiving fiber (a conventional 50 micron core MMF). The coupling system results in approximately 2.7 dB optical insertion loss.

The testing system included an Agilent BERT system operating at 25 Gb/s, which was used to measure bit error rate (BER). The controller (N4960A-CJ1) controlled the pattern generator and error detector. Using a clock signal from the error detector, the pattern generator provides 231-1 PRBS pattern. The coupled MCF was prepared with lengths of 100 m and 150 m. The BER measurements were done at fiber lengths of 0 m (back to back), 100 m and 150 m. The received optical power was adjusted by slightly misalignment in the optical setup, monitored by an optical power meter. As a result, the level of optical attenuation could be varied to obtain the BER vs. received optical power for the three configurations.

Figure 15:
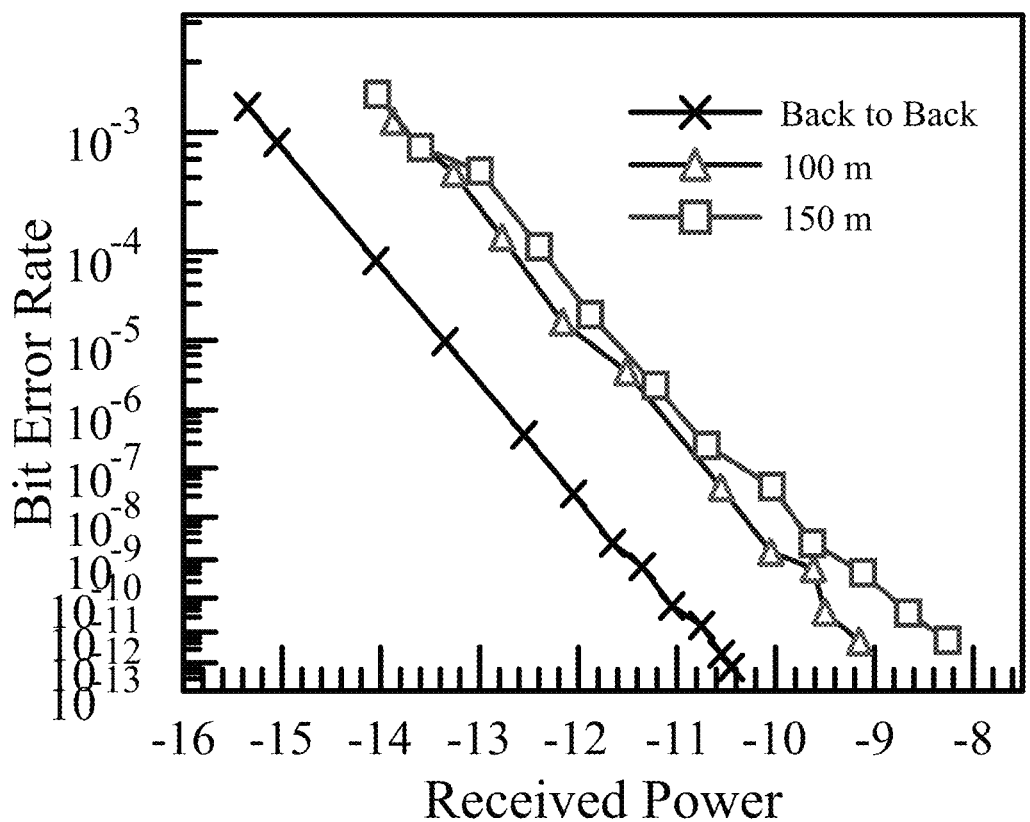
FIG. 15 shows the measured BER as a function of received power for an exemplary multimode optical fiber in accordance with some embodiments of the current disclosure.

FIG. 15 shows the measured BER as a function of received power. Under the back to back condition, the system could reach error free performance at around −10.4 dBm. With the introduction of 100 m fiber, the system showed some power penalty, but could stay error free for 5 minutes with around −9 dBm received power. At 150 m, more power penalty appeared and the system could still achieve error free performance for 3 minutes with around −7.8 dBm optical power. Note that 150 m is well beyond the specification distance for OM4, benefiting from the high bandwidth of the coupled MCF.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A multimode optical fiber having a bandwidth of greater than 2 GHz·km, comprising:
    a glass matrix having a front endface, a back endface, a length L, a refractive index $n_{20}$ and a central axis; and
    a plurality of cores arranged within the glass matrix,
        wherein the plurality of cores run generally parallel to the central axis between the front and back endfaces and having respective refractive indices $n_{50}$, wherein $n_{50} > n_{20}$,
        wherein the glass matrix serves as a common cladding for the plurality of cores so that each core and the common cladding define a waveguide,
        wherein each core is a single mode at an operating wavelength; and wherein any two cores have an center-to-center spacing s of 3 μm to 10 μm and a coupling coefficient of greater than 10 m$^{-1}$ but less than 200 m$^{-1}$.

2. The optical fiber of claim 1, wherein the glass matrix has a diameter DC of 30 to 100 um.

3. The optical fiber of claim 1, wherein the optical fiber has a diameter DF of 80 to 200 um.

4. The optical fiber of claim 1, wherein a diameter d of each core is 2 um to 10 um.

5. The optical fiber of claim 1, wherein the center-to-center spacing s is 3 to 5 um.

6. The optical fiber of claim 1, wherein a ratio s/d of a center-to-center core spacing s over a core diameter d is in the range of 1.1 to 10.

7. The optical fiber of claim 1, wherein a ratio s/d of a center-to-center core spacing s over a core diameter d is in the range of 1.2 to 6.

8. The optical fiber of claim 1, wherein each core has a refractive index profile characterized by a core delta $\Delta_1$ and a core radius r and a core shape parameter α.

9. The optical fiber of claim 6, wherein a core delta $\Delta_1$ is 0.2% to 2%.

10. The optical fiber of claim 6, wherein a core delta $\Delta_1$ is 0.3% to 1%.

11. The optical fiber of claim 6, wherein each core has a core radius of 1 μm to 5 μm.

12. The optical fiber of claim 6, wherein each core has a core radius of 1.5 μm to 4.5 μm.

13. The optical fiber of claim 6, wherein the core is a graded index core having a core shape parameter α of 1 to 10.

14. The optical fiber of claim 6, wherein the core is a step index core having a core shape parameter α of greater than 10.

15. The optical fiber of claim 6, wherein the core is a step index core having a core shape parameter α of 10 to 1000.

16. The optical fiber of claim 1, wherein one or more of the plurality of cores comprises a low index trench having a trench delta $\Delta_2$ of 0.1% to 0.7% and a trench width w of 0.5 to 5 μm.

17. The optical fiber of claim 13, wherein a low index trench is offset from the core by 0 to 5 μm.

18. The optical fiber of claim 1, having a super-mode with an effective index difference of less than $1 \times 10^{-4}$.

19. The optical fiber of claim 1, wherein the bandwidth is greater than 4 GHz·km.

20. A fiber bundle, comprising: two or more of the multicore optical fibers according to claim 1, arranged with the front end faces in a first common endface plane and the back end faces in a second common endface plane.

21. An optical fiber communication system, comprising:
at least one multicore optical fiber according to claim 1;
an optical transmitter optically coupled to the front endface and that generates light at an operating wavelength of the at least one multicore optical fiber, wherein the light travels within the cores of the at least one multicore fiber as guided light; and
a detector optically coupled to the back endface and that detects the guided light that exits the cores of the multicore fiber at the back endface.

22. The optical fiber communication system of claim 21, wherein the optical transmitter is a VCSEL-based transmitter.

23. The optical fiber communication system of claim 21, wherein the optical transmitter is an SiPh-based.

* * * * *